United States Patent
Ho et al.

(10) Patent No.: US 11,863,107 B2
(45) Date of Patent: Jan. 2, 2024

(54) DEVICE AND METHOD FOR CONTROLLING ROTARY ELECTRIC MACHINE

(71) Applicant: Delta Electronics, Inc., Taoyuan (TW)

(72) Inventors: Min-Hsien Ho, Taoyuan (TW); Ming-Tsung Chen, Taoyuan (TW); Yu-Ling Lee, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 1115 days.

(21) Appl. No.: 16/410,744

(22) Filed: May 13, 2019

(65) Prior Publication Data
US 2020/0195176 A1 Jun. 18, 2020

(30) Foreign Application Priority Data
Dec. 13, 2018 (CN) .......................... 201811526858.6

(51) Int. Cl.
*H02P 21/02* (2006.01)
*H02P 6/15* (2016.01)

(52) U.S. Cl.
CPC .......... *H02P 6/153* (2016.02); *H02P 2203/11* (2013.01)

(58) Field of Classification Search
CPC ...... H02P 21/02; H02P 6/153; H02P 21/0025; H02P 6/183; H02P 2203/11
See application file for complete search history.

(56) References Cited

U.S. PATENT DOCUMENTS

2008/0111516 A1* 5/2008 Inokuma ................. H02P 21/14
318/799
2009/0039813 A1* 2/2009 Yamada ................. H02P 29/68
318/434

(Continued)

FOREIGN PATENT DOCUMENTS

CN 102751936 A 10/2012
CN 107872174 A 4/2018

(Continued)

OTHER PUBLICATIONS

Office Action issued in corresponding CN application No. 201811526858.6 dated Apr. 19, 2021 (8 pages).

*Primary Examiner* — Kawing Chan
*Assistant Examiner* — Gabriel Agared
(74) *Attorney, Agent, or Firm* — MUNCY, GEISSLER, OLDS & LOWE, P.C.

(57) ABSTRACT

A control device for controlling a rotary electric machine, the control device includes a current command unit, a voltage conversion device, a current conversion device, a signal demodulation device, an error compensation unit, an adding device and a position estimation device. The current command unit provides a d-axis current command and a q-axis current command. The current conversion device converts a current of the rotary electric machine to a synchronous reference coordinate current. The signal demodulation device computes a current variation of a high-frequency synchronous reference coordinate current. The error compensation device outputs a first correction value. The adding device adds the current variation of the high-frequency synchronous reference coordinate current and the first correction value to generate a second correction value. Based on the second correction value, the position estimation device adjusts a phase estimation value for the current conversion device and the voltage conversion device.

16 Claims, 6 Drawing Sheets

(56) References Cited

U.S. PATENT DOCUMENTS

| | | | |
|---|---|---|---|
| 2014/0145660 A1* | 5/2014 | Shimada | H02P 21/24 318/400.33 |
| 2015/0244298 A1* | 8/2015 | Takaki | H02P 21/18 318/400.32 |
| 2015/0357956 A1* | 12/2015 | Shimada | H02P 6/181 318/400.02 |
| 2017/0054395 A1 | 2/2017 | Zhao et al. | |
| 2018/0138841 A1 | 5/2018 | Campbell et al. | |

FOREIGN PATENT DOCUMENTS

| | | |
|---|---|---|
| CN | 108336937 A | 7/2018 |
| CN | 108631680 A | 10/2018 |
| CN | 108900127 A | 11/2018 |
| EP | 2 191 564 B1 | 10/2015 |
| TW | 200306059 A | 11/2003 |
| TW | 201027901 A | 7/2010 |
| WO | WO 00/25418 A1 | 5/2000 |
| WO | WO 2010/073865 A1 | 7/2010 |

* cited by examiner

DEVICE AND METHOD FOR CONTROLLING ROTARY ELECTRIC MACHINE

CROSS REFERENCE TO RELATED APPLICATIONS

This application claims priority of China Patent Application No. 201811526858.6, filed on Dec. 13, 2018, the entirety of which is incorporated by reference herein.

BACKGROUND OF THE INVENTION

Field of the Invention

The present invention relates to a device and a method for controlling a rotary electric machine and, in particular, to a control device for the rotary electric machine without a shaft position sensor and its control method.

Description of the Related Art

In recent years, the driving techniques applied to permanent-magnetic synchronous motors (PMSM) without shaft position sensors become an important trend in the development of rotary electric machines. Because of the removal of the shaft position sensor and its connection wiring, the volume of rotary electric machines and the cost of producing them have been greatly reduced, and the reliability of such systems has been promoted.

Currently, driving techniques without a shaft position sensor can be divided into two major types: back electromotive force (EMF) and high-frequency signal injection. EMF method estimates rotor position and velocity of a rotary electric machine in accordance with the voltage model of the rotary electric machine, but this methodology is only appropriate for rotary electric machines that rotate at medium or high speeds. On the other hand, the high-frequency signal injection method injects a high-frequency signal into stationary coordinate of a rotary electric machine or synchronous coordinate of the rotary electric machine, and the high-frequency signal injection method is suitable for rotary electric machines that rotate at zero, low, or medium speeds. However, the cross-coupling effect between d axis and q axis will affects the position estimation. The cross coupling effect between the d axis and the q axis results in a constant offset error when the rotary electric machine control devices estimate the rotor position. The error value causes oscillation when the rotary electric machine rotates at low speed. The efficiency of the rotary electric machine's rotation is reduced. To minimize the estimation error of the rotor position mentioned above, an error compensation device is configured adapting into a rotary electric machine control device. However, traditional error compensation devices need to collect a large amount of different types of signals and relative information, including the high-frequency flux current and the high-frequency torque current of the synchronous coordinate, the d-axis current and the q-axis current of the stationary coordinate, and the measured rotor position, and among others. In addition, the error compensation device needs to be matched with a controller (such as a PI controller) in order to increase the accuracy of estimating the rotary electric machine's position. As a result, the computation time of system and processor would be increased noticeably, and the cost of building such a system is increased, and the work efficiency of the processor or memory is reduced.

BRIEF SUMMARY OF THE INVENTION

In view of this, the present invention proposes a rotary electric machine control device, and it has an error compensation unit to reduce the amount of collected signals and information, and for simplifying the operational procedures of processor.

A control device for controlling a rotary electric machine is proposed, the control device comprising: a current command unit, a voltage conversion device, a current conversion device, a signal demodulation device, an error compensation unit, an adding device and a position estimation device. The current command unit provides a d-axis current command and a q-axis current command. The voltage conversion device is electrically coupled to the current command unit and the rotary electric machine. The current conversion device converts a rotary electric machine current which passes through the rotary electric machine into a synchronous reference coordinate current. The signal demodulation device receives the synchronous reference coordinate current and computes a high-frequency current variation of the synchronous reference coordinate current. The error compensation unit outputs a first correction value, corresponding to the d-axis current command and the q-axis current command, based on the d-axis current command and the q-axis current command respectively. The adding device adds the high-frequency current variation of the synchronous reference coordinate current and the first correction value to generate a second correction value. The position estimation device adjusts a phase estimation value to the voltage conversion device and the current conversion device based on the second correction value to perform a coordinate transformation calculation.

A control method for a rotary electric machine comprises the following steps listed below. Provide a d-axis current command and a q-axis current command; convert a rotary electric machine current passing through the rotary electric machine into a synchronous reference coordinate current. Compute a high-frequency current variation of the synchronous reference coordinate current. According to the d-axis current command and the q-axis current command, output a first correction value corresponding to the d-axis current command and the q-axis current command. Add the high-frequency current variation of the synchronous reference coordinate current and the first correction value to generate a second correction value. Output a phase estimation value to perform a coordinate transformation calculation.

DETAILED DESCRIPTION OF THE INVENTION

Figure 1:
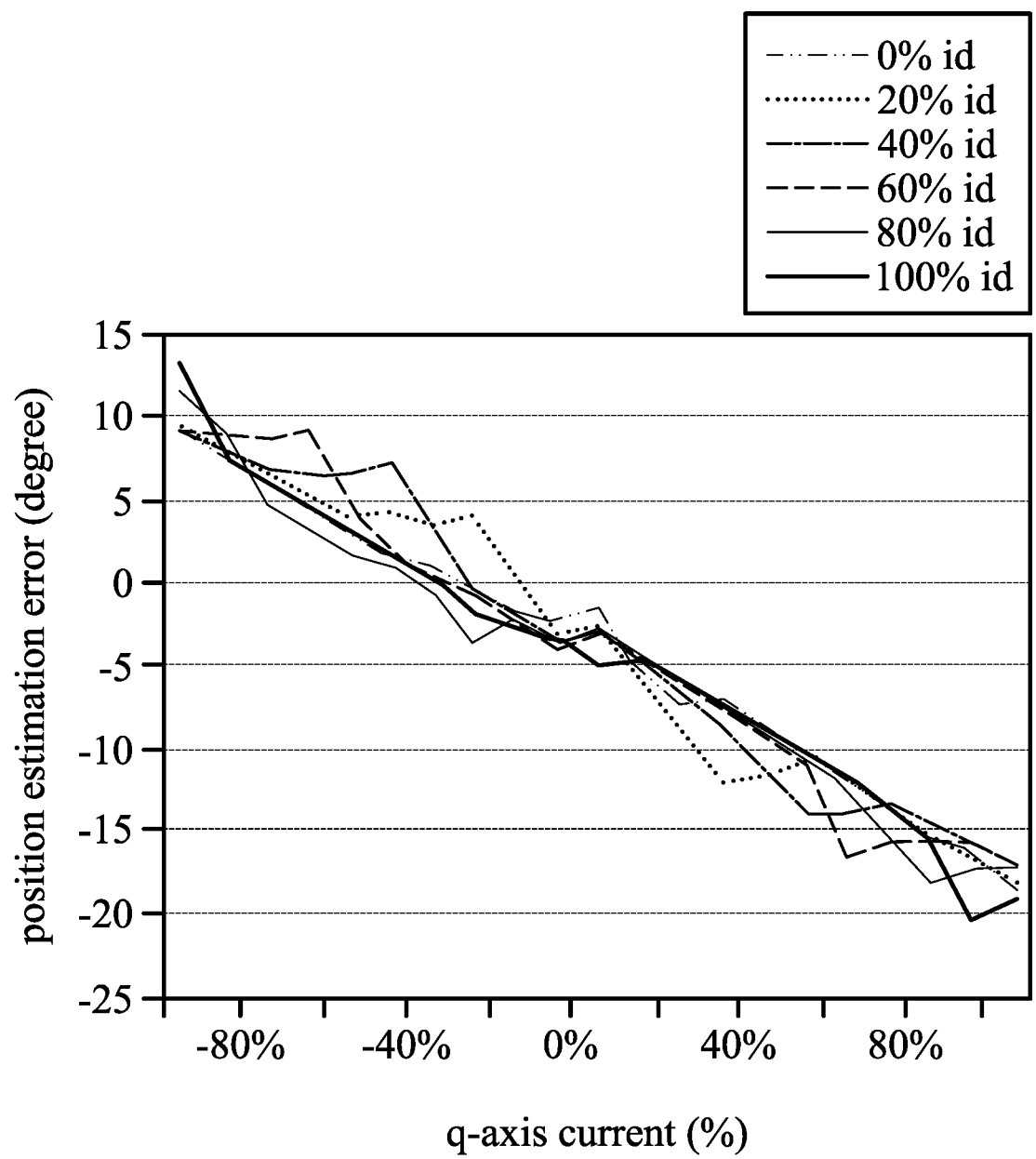
FIG. 1 is a relationship diagram of estimation error and d-q axis current of a rotary electric machine control device, in accordance with an embodiment of the prior art.

The present invention is described with reference to the attached figures, where like reference numerals are used throughout the figures to designate similar or equivalent elements. The figures are not drawn to scale and are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details, or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The following description is an embodiment of the present invention. The purpose of the present invention is to exemplify the general principles of the invention and should not be construed as limiting the scope of the invention, which is defined by the scope of the claims.

FIG. 1 is a relationship diagram of position estimation error and the d-q axis current of a rotary electric machine control device, in accordance with an embodiment of the conventional art. In FIG. 1, the vertical axis depicts position estimation errors estimated by the control device of a rotary electric machine, and the horizontal axis depicts the values of q-axis current (iq). Regarding experiment conditions, the magnitude of the d-axis current (id) can be adjusted between 0%-100% of a maximum rated current, and the magnitude of the q-axis current can be adjusted between 0%-100% of the maximum rated current. The unit of the position estimation error on the vertical axis is degree. In this experiment, according to FIG. 1, the d-axis current is individually within 0%-100% of different six sectional curves. When the d-axis current remains a constant value, no matter the q-axis current is a forward or reverse current, the value of q-axis current becomes larger, and the position estimation error generated by the rotary electric machine control device becomes larger. For example, under the case where the d-axis current is maintained at 100% of the maximum rated current, the position estimation error increases as the q-axis current value increases. The position estimation error is a DC offset current caused by the cross-coupling effect between d axis and q axis. The DC offset current can directly or indirectly influences the accuracy of the rotary electric machine's rotor positions estimated by the rotary electric machine control device.

For solving the problems mentioned above, the present invention proposes a control device of the electric machine for promoting the accuracy of estimating the rotary electric machine's rotor positions. The control device provided by the present invention can be operated in a more simplified manner to promote the accuracy of estimating the rotary electric machine's rotor positions. The operation principle and procedure of the present invention will be described in detail below.

Figure 2:
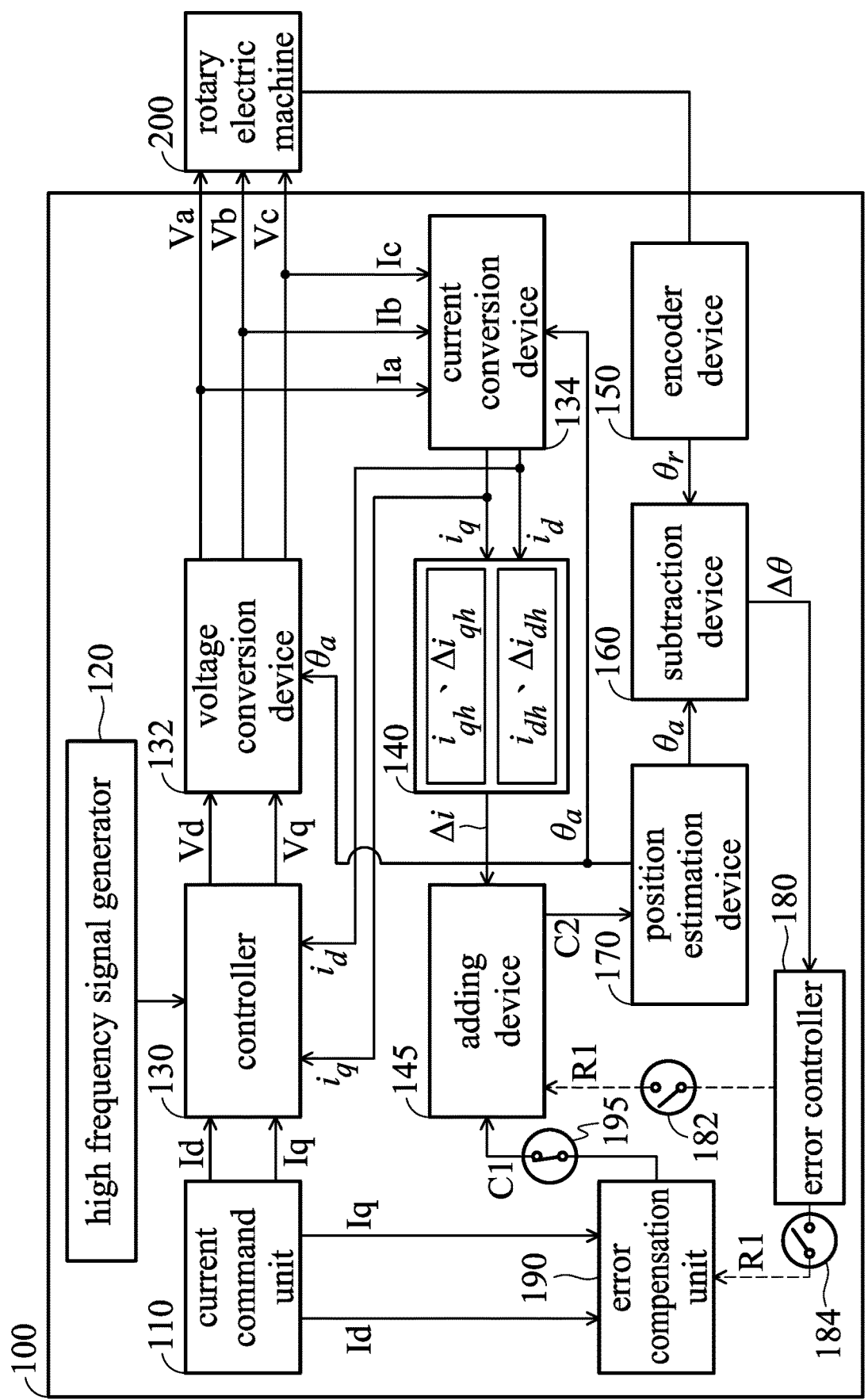
FIG. 2 is a block diagram of the control device of the rotary electric machine, in accordance with an embodiment of the present invention.

FIG. 2 is a block diagram of the control device 100 of the rotary electric machine 200, in accordance with an embodiment of the present invention. In the present invention, the control device 100, used for controlling the rotary electric machine 200, includes a current command unit 110, a controller 130, a current conversion device 134, a voltage conversion device 132, a signal demodulation device 140, an error compensation unit 190, an adding device 145, a position estimation device 170, an encoder device 150, a subtraction device 160, an error controller 180 and a plurality of switches (182, 184, 195). When the rotary electric machine 200 operates normally, the switches 182, 184 are turned off, and the switch 195 is turned on. As a result, when the rotary electric machine 200 operates normally, the signals output from the error controller 180 cannot be provided to the adding device 145 and error compensation unit 190.

In the present invention, the voltage conversion device 132 is electrically coupled to the current command unit 110 and the rotary electric machine 200. At first, the current command unit 110 in the control device 100 is configured to provide the d-axis current command Id and the q-axis current command Iq. The controller 130 receives the d-axis current command Id, the q-axis current command Iq and a high-frequency signal generated and inputted by a high-frequency signal generator 120, and then the controller 130 correspondingly outputs the d-axis voltage Vd and the q-axis voltage Vq on the synchronous coordinate. Then, by using the voltage conversion device 132, the d-axis voltage Vd and the q-axis voltage Vq are converted to three-phase voltages (Va, Vb, Vc) on the stationary coordinate for rotating the rotary electric machine 200.

In this embodiment, the voltage conversion device 132 in the present invention includes synchronous/stationary axis converter, stationary/three-phase axis converter and inverter . . . etc. However, the present invention is not limited to this. In some embodiments of the present invention, the rotary electric machine 200 is a three-phase permanent magnet synchronous motor (three-phase PMSM), and the control of this kind of motors is usually based on the synchronous coordinate. As a result, if the voltage conversion device 132 mentioned above makes use of a synchronous/stationary axis converter, the d-axis voltage Vd and the q-axis voltage Vq output from the controller 130 could be converted to the d-axis voltage and the q-axis voltage on the stationary coordinate. By using a stationary/three-phase axis converter, the d-axis voltage and the q-axis voltage on the stationary coordinate could be further converted to three-phase voltages Va, Vb, Vc. In this embodiment, the voltage conversion device 132 can also include an inverter for adjusting the amplitude and frequency of the three-phase voltages Va, Vb, Vc to the rotary electric machine 200. One having ordinary skill in the art will comprehend the operation principles of the synchronous/stationary axis converter and the stationary/three-phase axis converter and inverter, and the present disclosure does not repeatedly recite the description herein and does not show them in FIG. 2.

In the present invention, the current conversion device 134 retrieves the rotary electric machine currents Ia, Ib, Ic passing through the rotary electric machine 200, and then converts the rotary electric machine currents Ia, Ib, Ic to a synchronous reference coordinate current. The rotary electric machine currents Ia, Ib, Ic can be individually defined as a magnetic flux current $i_d$ and a torque current $i_q$ for the components of d-axis and q-axis current on the synchronous coordinate. As a result, through a coordinate transformation, the rotary electric machine currents Ia, Ib, Ic can be converted to the synchronous reference coordinate current. The synchronous reference coordinate current further can be resolved into the magnetic flux current $i_d$ and the torque current $i_q$. The three-phase rotary electric machine currents Ia, Ib, Ic are the stator current of the rotary electric machine 200, and the magnetic flux current $i_d$ and the torque current $i_q$ are the currents on the synchronous coordinate. Because of the different references of coordinate systems, the current conversion device 134 includes a three-phase/stationary axis converter and a stationary/synchronous axis converter. The current conversion device 134 can convert the rotary electric machine currents Ia, Ib, Ic on the stationary coordinate to the magnetic flux current $i_d$ and the torque current $i_q$ on the synchronous coordinate. After the magnetic flux current $i_d$ and the torque current $i_q$ are processed by a high-pass filter (not shown) in the signal demodulation device 140, the high-frequency magnetic flux current $i_{dh}$ and the high-frequency torque current $i_{qh}$ can be generated. One having ordinary skill in the art will comprehend that the operation principles of the three-phase/stationary axis converter and the stationary/synchronous axis converter, the present disclosure does not depict the same in FIG. 2. It is particularly noted that in the present invention, the high-frequency magnetic flux current $i_{dh}$ is a partial current signal of the d-axis current flowing through a rotor of the rotary electric machine 200, and the high-frequency torque current $i_{qh}$ is a partial current signal of the q-axis current flowing through the rotor of the rotary electric machine 200. In the vector control concepts of rotary electric machines, controlling the d-axis current or voltage can adjust the stator flux of the rotary electric machine 200, and controlling the q-axis current or voltage can adjust the output torque of the rotary electric machine 200.

In this embodiment, the signal demodulation device 140 receives the magnetic flux current $i_d$ and the torque current $i_q$ output from the current conversion device 134, and then generates the high-frequency magnetic flux current $i_{dh}$ and the high-frequency torque current $i_{qh}$ by using a motor mathematical model (or a high-frequency current equation) and the high-pass filter. The high-frequency current equation is shown below:

$$i_{qh} = \frac{v_h}{p\left[\left(\frac{L_q + L_d}{2}\right)^2 - \left(\frac{L_q - L_d}{2}\right)^2 - L_{dq}^2\right]} \left(\frac{L_q - L_d}{2}\sin(2\Delta\theta) + L_{dq}\cos(2\Delta\theta)\right)$$

$$i_{dh} = \frac{v_h}{p\left[\left(\frac{L_q + L_d}{2}\right)^2 - \left(\frac{L_q - L_d}{2}\right)^2 - L_{dq}^2\right]}$$

$$\left(\frac{L_q + L_d}{2} + \frac{L_q - L_d}{2}\cos(2\Delta\theta) + L_{dq}\sin(2\Delta\theta)\right),$$

wherein the $i_{qh}$ is the high-frequency torque current, $i_{dh}$ is the high-frequency magnetic flux current, p is a differential operator, $L_{dq}$ is a cross-coupling inductance, $L_d$ is a d-axis inductance, $L_q$ is a q-axis inductance, and wherein $L_d$ and $L_q$ are measured values. Additionally, the cross-coupling inductance $L_{dq}$ is the main factor causing the reduction of the accuracy of rotary electric machine's rotor position estimated by the control device 100 of rotary electric machine 200. The value of cross-coupling inductance $L_{dq}$ is proportional to the high-frequency torque current value $i_{qh}$. The high-frequency torque current value $i_{qh}$ becomes larger, and the cross-coupling inductance $L_{dq}$ is increased. The operation of the control device 100 to reduce the effect of the cross-coupling inductance $L_{dq}$ is described in detail below.

In this embodiment, the signal demodulation device 140 of the control device 100 is electrically coupled to the current conversion device 134, and includes a high-pass filter (not shown). The signal demodulation device 140 receives the magnetic flux current $i_d$ and the torque current $i_q$ output from the current conversion device 134. The signal demodulation device 140 further computes a current variation $\Delta i_{qh}$ of the high-frequency torque current $i_{qh}$ and a current variation $\Delta i_{dh}$ of the high-frequency magnetic flux current $i_{dh}$ according to a demodulation equation shown below:

$$\Delta i_{qh} = \frac{v_h \Delta T}{\left[\left(\frac{L_q + L_d}{2}\right)^2 - \left(\frac{L_q - L_d}{2}\right)^2 - L_{dq}^2\right]} \left(\frac{L_q - L_d}{2}\sin(2\Delta\theta) + L_{dq}\cos(2\Delta\theta)\right)$$

$$\Delta i_{dh} = \frac{v_h \Delta T}{\left[\left(\frac{L_q + L_d}{2}\right)^2 - \left(\frac{L_q - L_d}{2}\right)^2 - L_{dq}^2\right]}$$

$$\left(\frac{L_q + L_d}{2} + \frac{L_q - L_d}{2}\cos(2\Delta\theta) + L_{dq}\sin(2\Delta\theta)\right)$$

Wherein $v_h$ is a high-frequency signal, and value of $v_h$ can be positive or negative. In this embodiment, the high-frequency signal can be a square wave signal, but the invention is not limited thereto. It should be noted that the cross-coupling inductance $L_{dq}$ can be discovered in the current variation $\Delta i_{qh}$ of the high-frequency torque current $i_{qh}$ and the current variation $\Delta i_{dh}$ of the high-frequency magnetic flux current $i_{dh}$ so that the cross-coupling inductance $L_{dq}$ can be considered as a DC offset current of the position estimation error. The main technique of the present invention is to eliminate the effects that the cross-coupling inductance $L_{dq}$ influences the current variation $\Delta i_{qh}$ of the high-frequency torque current $i_{qh}$, the current variation $\Delta i_{dh}$ of the high-frequency magnetic flux current $i_{dh}$ and the control device 100 of the rotary electric machine 200.

In addition, the current variation $\Delta i$ output by the signal demodulation device 140 is the high-frequency current variation on the synchronous coordinate mentioned above. The current variation $\Delta i_{qh}$ of the high-frequency torque current $i_{qh}$, the current variation $\Delta i_{dh}$ of the high-frequency magnetic flux current $i_{dh}$, or a combination of both can represent as the high-frequency current variation $\Delta i$ on the synchronous coordinate. In order to briefly illustrate the following embodiments, the current variation $\Delta i$ is only used to represent the current variation $\Delta i_{qh}$ of the high-frequency torque current $i_{qh}$, the current variation $\Delta i_{dh}$ of the high-frequency magnetic flux current $i_{dh}$, or a combination of both, but the present invention is not limited to this.

In this embodiment, the error compensation unit 190 is electrically coupled to the current command unit 110, and receives the d-axis current command Id and the q-axis current command Iq from the current command unit 110. The error compensation unit 190 outputs a first correction value C1 based on the d-axis current command Id and the q-axis current command Iq. In this embodiment, there is at least one table to be configured and built in the error compensation unit 190, and the error compensation unit 190 searches, look-up, or indexes the table to acquire a first correction value C1 that corresponds to the d-axis current command Id and the q-axis current command Iq at present. Then, the error compensation unit 190 outputs the searched first correction value C1 corresponding to the d-axis current command Id and the q-axis current command Iq at present to the adding device 145. The Table 1 shown below is an example that configured and built in the error compensation unit 190, and it only shows part of the first correction values C1. The d-axis current command Id and the q-axis current command Iq corresponding to each of the related first correction value C1 are not fully identical. For example, as shown in Table 1, C1(Id1,Iq1) means that the first correction value C1 corresponds the d-axis current command Id1 and the q-axis current command Iq1; while C1(Id2,Iq2) means that the first correction value C1 corresponds the d-axis current command Id2 and the q-axis current command Iq2; . . . and so on. However, the present invention is not limited to this.

TABLE 1

| d-axis current command | q-axis current command | | |
|---|---|---|---|
|  | Iq1 | Iq2 | Iq3 |
| Id1 | C1 (Id1, Iq1) | C1 (Id1, Iq2) | C1 (Id1, Iq3) |
| Id2 | C1 (Id2, Iq1) | C1 (Id2, Iq2) | C1 (Id2, Iq3) |
| Id3 | C1 (Id3, Iq1) | C1 (Id3, Iq2) | C1 (Id3, Iq3) |
| Id4 | C1 (Id4, Iq1) | C1 (Id4, Iq2) | C1 (Id4, Iq3) |

In this embodiment, the adding device 145 is electrically coupled to the error compensation unit 190, the signal demodulation device 140 and the position estimation device 170. The adding device 145 is used for adding the current variation $\Delta i$ and the first correction value C1 to generate a second correction value C2. The adding device 145 then outputs the generated second correction value C2 to the position estimation device 170. Eventually, according to the second correction value C2, the position estimation device 170 adjusts a phase estimation value $\theta_a$ to the current conversion device 134 and the voltage conversion device 132 for adjusting the magnetic flux current $i_d$ and the torque current $i_q$ respectively. The phase estimation value $\theta_a$ is the estimated position of the rotor. According to the phase estimation value $\theta_a$, the current conversion device 134 performs a coordinate transformation calculation to acquire the magnetic flux current $i_d$ and the torque current $i_q$; afterwards, the adjusted magnetic flux current $i_d$ and torque current $i_q$ can be delivered to the controller 130 for modifying the values of d-axis voltage Vd and q-axis voltage Vq. The voltage conversion device 132 then receives the signals mentioned above to indirectly adjust the three-phase voltages Va, Vb, Vc. As a result, the rotor position of rotary electric machine 200 can be adjusted, oscillation when the rotary electric machine 200 rotates at low speed can be reduced effectively, and the efficiency of operation of the rotary electric machine 200 can be increased.

In summary, the error compensation unit 190 outputs the first correction value C1 corresponding to the d-axis current command and the q-axis current command by searching the table. Then, the adding device 145 adds the searched first correction value C1 and the current variation $\Delta i$ to acquire the second correction value C2. As a result, the position estimation device 170 can perform the calculation based on the acquired second correction value C2 for effectively controlling and increasing the accuracy of phase estimation value $\theta_a$. The procedure of building the table in the error compensation unit 190 is described in detail as below.

Figure 3:
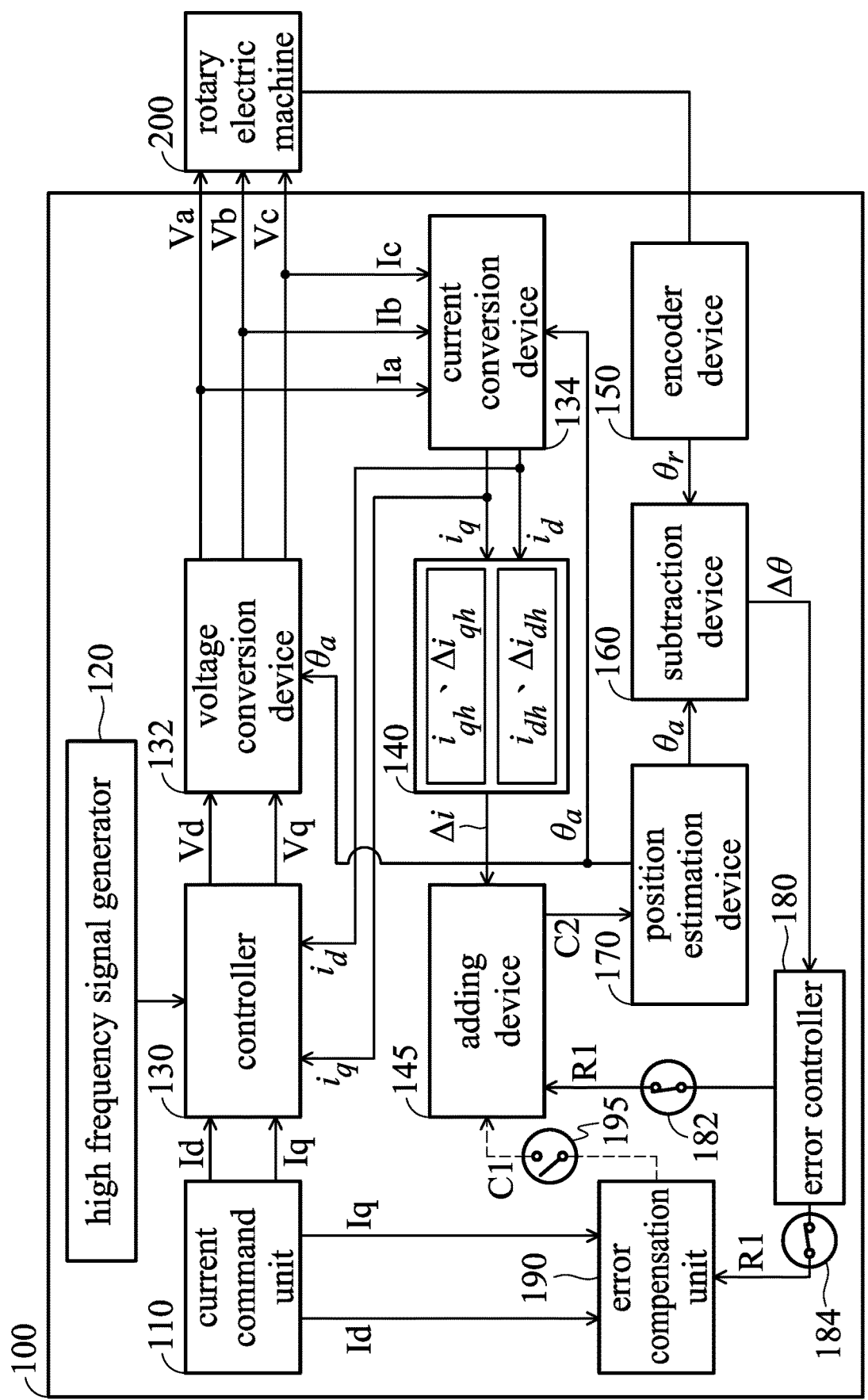
FIG. 3 is a block diagram of the control device of the rotary electric machine operates in a test mode, in accordance with an embodiment of the present invention.

FIG. 3 depicts a block diagram of the control device 100 of the rotary electric machine 200 operates in a test mode, in accordance with an embodiment of the present invention. In this embodiment, before building a table in the error compensation unit 190, the operators usually need to process a test mode to the rotary electric machine 200. As a result, the procedures of building the table described below are finished when the rotary electric machine 200 is continuously processed in the test mode.

In this embodiment, the switches 182 and 184 in the control device 100 are turned on, and the switch 195 is turned off. The encoder device 150 is used to measure the rotor position of the rotary electric machine 200 for outputting an actually measured phase measurement value $\theta_r$. The phase measurement value $\theta_r$ that is a really measured value which can be considered as the real position of the rotor. At the same time, the position estimation device 170 continuously outputs the phase estimation value $\theta_a$ to the current conversion device 134 and the subtraction device 160.

In some embodiments, the subtraction device 160 is electrically coupled to the encoder device 150, the position estimation device 170 and the error controller 180. When the rotary electric machine 200 operates in the test mode, through the subtraction device 160, the phase estimation value $\theta_a$ is subtracted from the actual measured phase measurement value $\theta_r$ to generate a phase error $\Delta\theta$ for the error controller 180. As described above, the phase error $\Delta\theta$ output by the subtraction device 160 is the difference between the actual rotor position and the estimated rotor position.

When the rotary electric machine 200 operates in the test mode, because of the switches 182 and 184 are turned on, the error controller 180 can continuously generate a revised value R1 to the adding device 145 based on the phase error $\Delta\theta$. It should be noted that when the rotary electric machine 200 operates in the test mode, the switch 195 between the error compensation unit 190 and the adding device 145 is turned off so that the adding device 145 cannot receive the first correction value C1 output by the error compensation unit 190. When the phase error $\Delta\theta$ falls within a target range, the error controller 180 assigns the revised value R1 at present as the first correction value C1. Then, the error compensation unit 190 stores the revised value R1 which assigned as the first correction value C1, the d-axis current command Id and the q-axis current command corresponding to the first correction value C1.

In some other embodiments, the error controller 180 can detect the phase error $\Delta\theta$. In general conditions, if the error controller 180 detects that the phase error $\Delta\theta$ is not substantially equal to zero, the error controller 180 then outputs the revised value R1 to the adding device 145. The adding device 145 then adds the revised value R1 and the current variation $\Delta i$ at present to generate the second correction value C2 for the position estimation device 170. Then, the position estimation device 170 then adjusts the phase estimation value $\theta_a$ for the subtraction device 160 so that the phase error $\Delta\theta$ output by the subtraction device 160 is adjusted. When the error controller 180 detects that the phase error $\Delta\theta$ is within the target range (Ex: the target range is 2%-4%), the error controller 180 takes the revised value R1 as the redefined and assigned new first correction value C1 at present, and the error compensation unit 190 then stores the revised value R1. At this time, the error compensation unit 190 records the revised value R1 assigned as the first correction value C1 and records the corresponding d-axis current command Id and q-axis current command Iq at present simultaneously. In addition; on contrary, when the error controller 180 detects that the phase error Δθ is out of the target range, the control device 100 performs the previous procedures for searching another phase error Δθ, and the error controller 180 identifies whether it is in the target range again.

When the current command unit 110 continuously provides different d-axis current command Id and q-axis current command Iq each time, the current variation Δi, for example, output by the signal demodulation device 140 can be directly or indirectly modified so that the phase error Δθ output by the subtraction device 160 is correspondingly modified. The error controller 180 will continuously adjust the revised value R1. When the error controller 180 detects that the phase error Δθ falls within the target range (Ex: the target range is 2%-4%), the error controller 180 stops adjusting the revised value R1 and then stores the revised value R1 at present in a table of the error compensation unit 190. The error compensation unit 190 stores each revised value R1 corresponding to the d-axis current command Id and q-axis current command Iq, and assigns the revised value R1 to be the redefined and assigned new first correction value C1 that corresponds to the present current commands continuously so as to build the table. As a result, the table includes a plurality of the tested first correction values C1, and each of the d-axis currents command Id and q-axis currents command Iq corresponding to the first correction values C1 is not fully identical.

Figure 4:
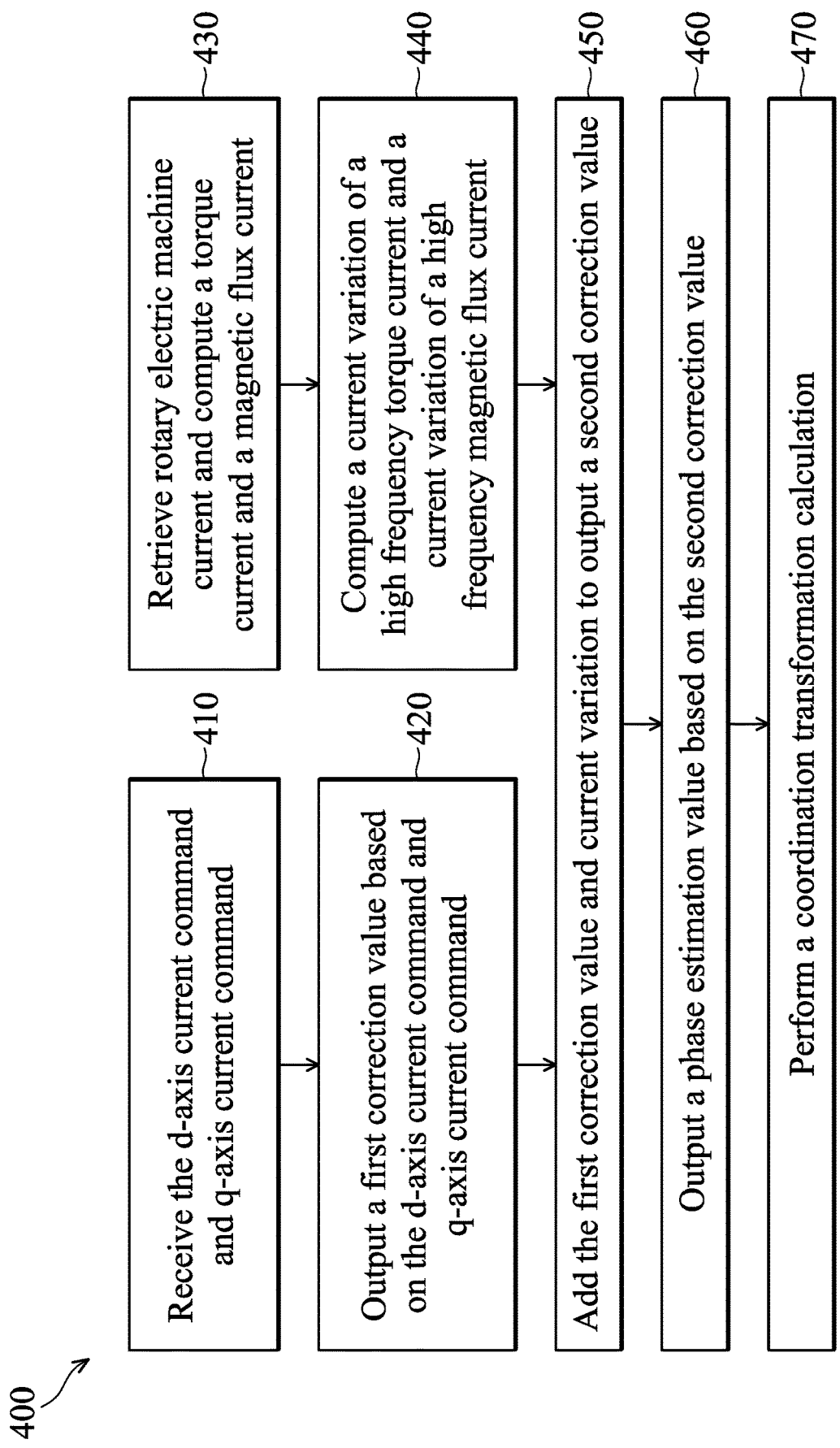
FIG. 4 depicts a flow chart of a control method for controlling a rotary electric machine, in accordance with an embodiment of the present invention.

FIG. 4 depicts a flow chart of control method 400 for controlling rotary electric machine 200, in accordance with an embodiment of the present invention. Please refer to FIG. 2 and FIG. 4 for illustrating the procedures of the control method 400 of the rotary electric machine 200. The control method 400 starts in step 410. In step 410, when the current command unit 110 starts to output the d-axis current command Id and q-axis current command Iq, the error compensation unit 190 starts to receive the d-axis current command Id and the q-axis current command Iq, and then step 420 is executed. At the same time, according to the d-axis current command Id and the q-axis current command Iq output by the current command unit 110, the controller 130 and the voltage conversion device 132 output the three-phase voltages Va, Vb, Vc to drive the rotary electric machine 200.

In step 420, according to the d-axis current command Id and the q-axis current command Iq output by the current command unit 110, the error compensation unit 190 outputs a first correction value C1 corresponding to the d-axis current command Id and the q-axis current command Iq at present. The error compensation unit 190 includes a table, as shown in Table 1 above. The error compensation unit 190 will finally find out a suitable first correction value C1 corresponding to the d-axis current command Id and the q-axis current command Iq at present in the Table 1, and then step 430 is executed.

In step 430, when the rotary electric machine 200 starts to rotate, the current conversion device 134 retrieves the rotary electric machine currents Ia, Ib, Ic passing through the rotary electric machine 200, and then computes the magnetic flux current $i_d$ and the torque current $i_q$, and then step 440 is executed.

In step 440, the signal demodulation device 140 receives the magnetic flux current $i_d$ and the torque current $i_q$, and then computes the high-frequency torque current $i_{qh}$ and the high-frequency magnetic flux current $i_{dh}$ based on a motor mathematical model or a high-frequency current equation. The motor mathematical model or the high-frequency current equation are identical with the description above, so the same descriptions will not be elaborated upon. The signal demodulation device 140 in the control device 100 also computes the current variation $\Delta i_{qh}$ of the high-frequency torque current $i_{qh}$ and/or the current variation $\Delta i_{dh}$ of the high-frequency magnetic flux current $i_{dh}$, according to the high-frequency torque current $i_{qh}$ and/or the high-frequency magnetic flux current $i_{dh}$. The demodulation equation for computing the current variation $\Delta i_{qh}$ of the high-frequency torque current $i_{qh}$ and the current variation $\Delta i_{dh}$ of the high-frequency magnetic flux current $i_{dh}$ is mentioned above, so the same will not be elaborated upon.

After steps 420 and 440, the control device 100 starts to execute step 450. The adding device 145 in the control device 100 adds the current variation $\Delta i_{qh}$ of the high-frequency torque current $i_{qh}$ and/or the current variation $\Delta i_{dh}$ of the high-frequency magnetic flux current $i_{dh}$ with the assigned first correction value C1 to generate the second correction value C2, and then the step 460 is executed.

In step 460, the position estimation device 170 in the control device 100 adjusts the phase estimation value $\theta_a$ based on the generated second correction value C2, and then delivers the adjusted phase estimation value $\theta_a$ to the current conversion device 134, and then step 470 is executed.

In step 470, according to the adjusted phase estimation value $\theta_a$, the current conversion device 134 performs a coordinate transformation calculation to acquire the magnetic flux current $i_d$ and the torque current $i_q$, and then the current conversion device 134 delivers the magnetic flux current $i_d$ and the torque current $i_q$ to the controller 130. The controller 130 then can adjust the values of the d-axis voltage Vd and the q-axis voltage Vq based on the magnetic flux current $i_d$ and the torque current $i_q$, and then the controller 130 delivers the signals mentioned previously to the voltage conversion device 132. Then, the voltage conversion device 132 performs the coordinate transformation calculation to indirectly adjust the three-phase voltages Va, Vb, Vc. As a result, the control device 100 can adjust the rotor position of the rotary electric machine 200, and the control device 100 can effectively reduce the oscillation caused by the rotary electric machine 200 rotating at low speed.

According to the control method 400 in FIG. 4, the control device 100 in the present invention, by means of the error compensation unit 190, outputs the first correction value C1 corresponding to the d-axis current command and the q-axis current command at present by means of searching a table. Then, the adding device 145 adds the assigned new first correction value C1 and the current variation Δi (the current variation $\Delta i_{qh}$ of the high-frequency torque current $i_{qh}$ and/or the current variation $\Delta i_{dh}$ of the high-frequency magnetic flux current $i_{dh}$) to acquire the second correction value C2. As a result, the position estimation device 170 can perform the calculation based on the acquired second correction value C2 for effectively controlling and increasing the accuracy of the phase estimation value $\theta_a$. Therefore, building the table in the error compensation unit 190 is one of the main features of the present invention. The procedure of building the table in the error compensation unit 190 is described in detail below.

Figure 5:
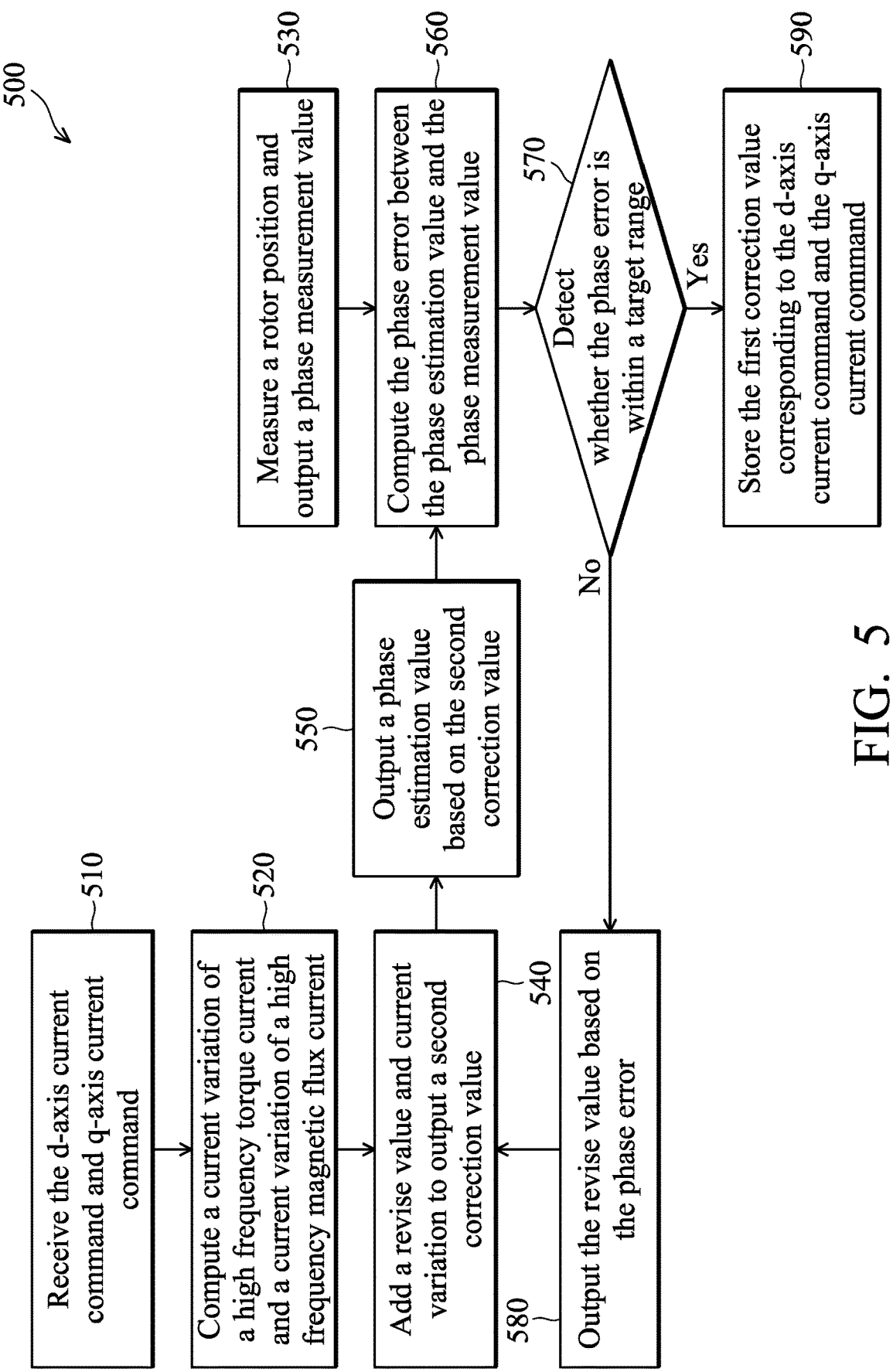
FIG. 5 depicts a flow chart of a control method for controlling a rotary electric machine operates in a test mode, in accordance with an embodiment of the present invention.

FIG. 5 depicts a flow chart of control method 500 for controlling rotary electric machine 200 operates in a test mode, in accordance with an embodiment of the present invention. Please refer to FIG. 3 and FIG. 5 for illustrating the procedures of the control method 500 of the rotary electric machine 200. The procedures of the control method 500 in FIG. 5 are mainly used for building the table stored or built in the error compensation unit 190. In this embodiment, before building a table in the error compensation unit 190, the operators usually need to make the rotary electric machine 200 operating in a test mode. As a result, the procedures of building a table described below are finished by the control device 100 when the rotary electric machine 200 is operated in a test mode continuously.

The control method 500 starts at step 510, and the rotary electric machine 200 remains a stationary status at this time. Also, by means of appropriate methods, the rotor is stopped from rotation. When the current command unit 110 starts to output the d-axis current command Id and the q-axis current command Iq, the controller 130 and the voltage conversion device 132 output the three-phase voltages Va, Vb, Vc based on the d-axis current command Id and the q-axis current command Iq output by the current command unit 110 for driving rotor of the rotary electric machine 200. In step 510, the current conversion device 134 retrieves the rotary electric machine currents Ia, Ib, Ic passing through the rotary electric machine 200, and performs the coordinate transformation calculation to acquire the magnetic flux current $i_d$ and the torque current $i_q$, and then step 520 is executed.

In step 520, according to the magnetic flux current $i_d$ and the torque current $i_q$ output from the current conversion device 134, the signal demodulation device 140 in the control device 100 computes the current variation $\Delta i_{qh}$ of the high-frequency torque current $i_{qh}$ and/or the current variation $\Delta i_{dh}$ of the high-frequency magnetic flux current $i_{dh}$ to the adding device 145. The equations for computing the current variation $\Delta i_{qh}$ of the high-frequency torque current $i_{qh}$ and the current variation $\Delta i_{dh}$ of the high-frequency magnetic flux current $i_{dh}$ are identical with the description provided above, so they are not repeatedly recited herein. At the same time, although the adding device 145 only receives the current variation $\Delta i$ (the current variation $\Delta i_{qh}$ of the high-frequency torque current $i_{qh}$ and/or the current variation $\Delta i_{dh}$ of the high-frequency magnetic flux current $i_{dh}$), the adding device 145 still executes step 540: to add a revised value R1 of the error controller 180 and the current variation $\Delta i$ (the current variation $\Delta i_{qh}$ of the high-frequency torque current $i_{qh}$ and/or the current variation $\Delta i_{dh}$ of the high-frequency magnetic flux current $i_{dh}$) to output a second correction value C2, and then step 550 is executed. It should be noted that when the control device 100 executes step 540 for the first time, the revised value R1 output by the error controller 180 is zero. As a result, at this time, the second correction value C2 output by the adding device 145 for the first time is in accordance with the current variation $\Delta i$ (the current variation $\Delta i_{qh}$ of the high-frequency torque current $i_{qh}$ and the current variation $\Delta i_{dh}$ of the high-frequency magnetic flux current $i_{dh}$).

In step 550, according to the second correction value C2, the position estimation device 170 outputs the phase estimation value $\theta_a$ to the subtraction device 160, and then step 560 is executed.

When the rotary electric machine 200 is controlled by the three-phase voltages Va, Vb, Vc, the control device 100 also executes step 530: the encoder device 150 in the control device 100 measures the rotor positions of the rotary electric machine 200 and outputs the actual measured phase measurement value $\theta_r$ to the subtraction device 160, and then step 560 is executed.

In step 560, the subtraction device 160 receives the phase estimation value $\theta_a$ and the actual measured phase measurement value $\theta_r$ from step 550 and step 530 respectively to compute the phase error $\Delta\theta$ between the phase estimation value $\theta_a$ and the actual measured phase measurement value $\theta_r$. After computing the phase error $\Delta\theta$, the control device 100 starts to perform step 570.

In step 570, the error controller 180 detects whether the phase error $\Delta\theta$ falls within a target range. As a result, when the error controller 180 detects that the phase error $\Delta\theta$ falls within the target range, the control device 100 executes step 590 and the error controller 180 controls the error compensation unit 190 to store the revised value R1 at present as the redefined and assigned new first correction value C1, and simultaneously records the d-axis current command Id and the q-axis current command Iq corresponding to the first correction value C1 at present. However, when the error controller 180 detects that the phase error $\Delta\theta$ is not within the target range, the control device 100 executes step 580 and outputs the revised value R1 based on the phase error $\Delta\theta$ at present.

It should be noted that, due to the previous step 540, the revised value R1 received by the adding device 145 in the initial step is zero, so when the control device 100 executes step 570 for the first time, the phase error $\Delta\theta$ received by the error controller 180 may possibly be outside the target range. As a result, the control device 100 will perform step 570 to step 580. After the error controller 180 outputs the revised value R1, the control device 100 performs step 540.

When the control device 100 performs step 540 again, the adding device 145 adds the revised value R1 of the error controller 180 and current variation $\Delta i$ (the current variation $\Delta i_{qh}$ of the high-frequency torque current $i_{qh}$ and/or the current variation $\Delta i_{dh}$ of the high-frequency magnetic flux current $i_{dh}$), and then adjusts the second correction value C2 to the position estimation device 170. The control device 100 continuously performs step 550.

In step 550, according to the adjusted second correction value C2, the position estimation device 170 adjusts the phase estimation value $\theta_a$ to the subtraction device 160. In step 560, the subtraction device 160 computes the phase error $\Delta\theta$ between the phase estimation value $\theta_a$ and the actual measured phase measurement value $\theta_r$, then Step 570 is executed. In step 570, the error controller 180 detects whether the phase error $\Delta\theta$ falls within the target range again. If the error controller 180 detects that the phase error $\Delta\theta$ falls within the target range, the control device 100 performs step 590, and then the error controller 180 controls the error compensation unit 190 to store the revised value R1 as the redefined and assigned new first correction value C1, and simultaneously records the d-axis current command Id and the q-axis current command Iq corresponding to the first correction value C1 at present.

As mentioned above, if the error controller 180 detects that the phase error $\Delta\theta$ is not within the target range, the control device 100 performs step 580, and the error controller 180 continuously adjusts the revised value R1 to the adding device 145 based on checking whether the phase error $\Delta\theta$ and the target range are matched. The control device 100 will uninterruptedly perform from the Steps 540 to 580 until the error controller 180 detects that the phase error $\Delta\theta$ falls within the target range in step 570.

When the current command unit 110 modifies the d-axis current command Id and the q-axis current command Iq each time, the control device 100 performs the procedures of the control method 500 mentioned above. As a result, when the current command unit 110 continuously modifies the d-axis current command Id and the q-axis current command Iq a plurality of times or loops, the error compensation unit 190 can build the table. The operators can determine how many times or loops the control method 500 is performed, depending on demand. If the control device 100 performs the control method 500 more times or loops, there would be more sets of current commands recorded in the table of the error compensation unit 190. When the rotary electric machine 200 works normally, the rotor position of the rotary electric machine 200 estimated by the control device 100 becomes more accurate accordingly. As a result, it is much more effective to solve the phenomenon of the oscillation caused by the rotary electric machine 200 rotating at low speed, and increase the efficiency of the operation of the rotary electric machine 200.

Figure 6:
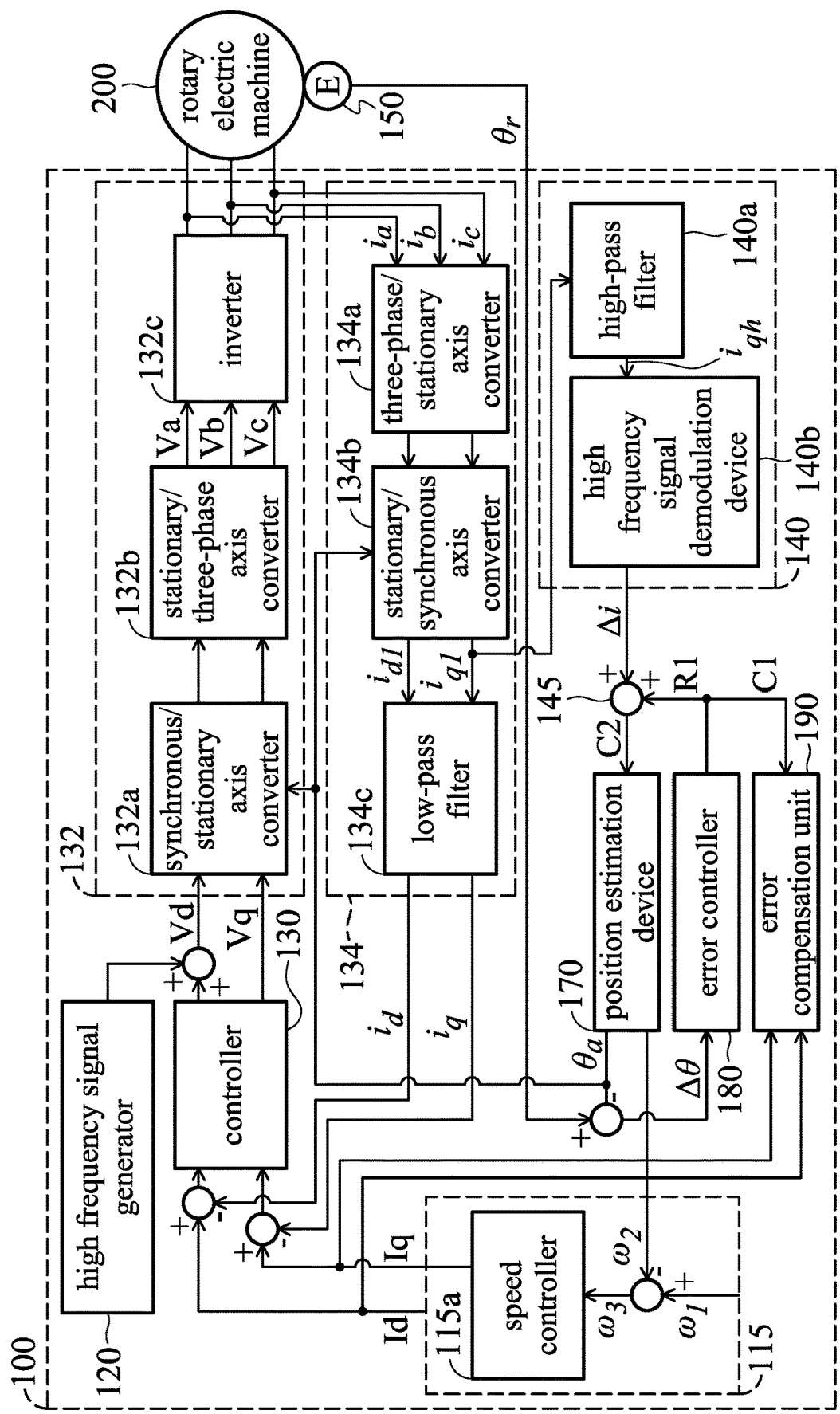
FIG. 6 depicts a real operation block diagram of the control device of the rotary electric machine, in accordance with an embodiment of the present invention.

FIG. 6 is a practical operation block diagram of the control device 100 of the rotary electric machine 200, in accordance with an embodiment of the present invention. The speed control unit 115 is an embodiment of the current command unit 110 mentioned previously, but the present invention is not limited to. The speed control unit 115 can provide the d-axis current command Id, and a speed controller 115a in the speed control unit 115 can provide the q-axis current command Iq. Then, the controller 130 and the voltage conversion device 132 generate the three-phase voltages Va, Vb, Vc to the rotary electric machine 200. The voltage conversion device 132 includes a synchronous/stationary axis converter 132a, a stationary/three-phase axis converter 132b and an inverter 132c. The rotary electric machine 200 rotates based on the three-phase voltages Va, Vb, Vc. The synchronous/stationary axis converter 132a, the stationary/three-phase axis converter 132b and the inverter 132c are prior arts, so the present disclosure does not recite them again.

In one of the other embodiments, the speed control unit 115 further includes a speed controller 115a. The processors, micro-processors or other computing devices can provide a rotating speed command $\omega_1$ to the speed control unit 115. One having ordinary skill in the art will comprehend the techniques that the processors, micro-processors and other computing devices can provide with regard to the rotating speed command $\omega_1$, and it is not drawn in FIG. 6. The position estimation device 170 also can generate the estimated speed feedback $\omega_2$ to the speed control unit 115. The speed control unit 115 still can generate the rotating speed error $\omega_3$ based on computing the rotating speed command $\omega_1$ and the estimated speed feedback $\omega_2$. The rotating speed error $\omega_3$ is a rotating speed error between the rotating speed commands $\omega_1$ and estimated speed feedback $\omega_2$ mentioned previously, so that the speed controller 115a generates the q-axis current command Iq based on the rotating speed error $\omega_3$.

When the rotary electric machine 200 rotates based on the three-phase voltages Va, Vb, Vc, the current conversion device 134 receives the rotary electric machine currents Ia, Ib, Ic passing through the rotary electric machine 200, and then computes the torque current $i_q$ and the magnetic flux current $i_d$. The current conversion device 134 includes a three-phase/stationary axis converter 134a, a stationary/synchronous axis converter 134b and a low-pass filter 134c. The three-phase/stationary axis converter 134a and the stationary/synchronous axis converter 134b in the current conversion device 134 can compute the torque current $i_{q1}$ and the magnetic flux current $i_{d1}$ on the synchronous coordinate. It should be noted that in this embodiment, the present invention simply selectively makes use of the torque current $i_{q1}$ on the synchronous coordinate to perform the calculation for increasing the accuracy of position estimation, but the present invention is not limited to. The high-frequency current equations defined by the three-phase/stationary axis converter 134a and the stationary/synchronous axis converter 134b are as mentioned above, so is the same are not repeatedly recited herein.

After the current conversion device 134 finished the computation of the torque current $i_{q1}$ on the synchronous coordinate, the signal demodulation device 140 computes the high-frequency torque current $i_{qh}$ and the current variation $\Delta i_{qh}$ of the high-frequency torque current $i_{qh}$. The signal demodulation device 140 includes a high-pass filter 140a and a high-frequency signal demodulation device 140b. The high-pass filter 140a computes the high-frequency torque current $i_{qh}$ based on the torque current $i_{q1}$. The high-frequency signal demodulation device 140b has a demodulation equation therein for computing the current variation $\Delta i_{qh}$. The demodulation equation is described above, so it will not be recited here again. When the rotary electric machine 200 is operated in the test mode, the method of building a table using the control device 100 has been described in detail previously, so the description will not be repeated.

In conclusion, the present invention makes use of the error compensation unit 190 to receive the d-axis current command Id and the q-axis current command Iq for outputting the first correction value C1. Then, the present invention computes the current variation $\Delta i_{qh}$ of the high-frequency torque current $i_{qh}$ and/or the current variation $\Delta i_{dh}$ of the high-frequency magnetic flux current $i_{dh}$ for effectively controlling and increasing the accuracy of the phase estimation value $\theta_a$ estimated by the position estimation device 170. Compared to the current techniques, the present invention greatly reduces the amount of (signal) calculation in the processor, and more effectively improves the operation efficiency of the control device of the rotary electric machine 200. In addition, the present invention can also solve the oscillating phenomenon generated when the rotary electric machine 200 is operated at a low speed, and improve the operating efficiency of the rotary electric machine 200.

While the invention has been described above in terms of a preferred embodiment, it is not intended to limit the scope of the invention, and it should be understood by those of ordinary skill in the art without departing from the spirit and scope of the invention. Instead, the scope of the invention should be determined by the scope of the appended claims.

The terminology used herein is for the purpose of describing particular embodiments only and is not intended to limit the invention. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

What is claimed is:

1. A control device for controlling a rotary electric machine, the control device comprising:
    a current command unit, configured to provide a d-axis current command and a q-axis current command;
    a voltage conversion device, electrically coupled to the current command unit and the rotary electric machine;
    a current conversion device, converting a rotary electric machine current passing through the rotary electric machine into a synchronous reference coordinate current;
    a signal demodulation device, receiving the synchronous reference coordinate current and computing a high-frequency current variation of the synchronous reference coordinate current;

an error compensation unit, configured to output a first correction value corresponding to the d-axis current command and the q-axis current command, based on the d-axis current command and the q-axis current command respectively;

an adding device, receiving the high-frequency current variation of the synchronous reference coordinate current and adding the high-frequency current variation of the synchronous reference coordinate current and the first correction value to generate a second correction value to estimate a rotor position of the rotary electric machine;

a position estimation device, adjusting a phase estimation value to the voltage conversion device and the current conversion device based on the second correction value to perform a coordinate transformation calculation;

an encoder device, measuring the rotor position of the rotary electric machine to output a phase measurement value;

a subtraction device subtracting the phase estimation value from the phase measurement value to generate a phase error; and an error controller, when the rotary electric machine operates in a test mode, continuously receiving the phase error and generating a revised value to the adding device based on the phase error, wherein when the phase error falls within a target range, the revised value corresponding to the phase error is assigned as the first correction value, and then the error compensation unit stores the revised value and the d-axis current command and the q-axis current command correspond to the revised value.

2. The control device of claim 1, wherein when in the test mode, and when the phase error falls within the target range each time, the error compensation unit stores the first correction value corresponding to the d-axis current command and the q-axis current command to build a table.

3. The control device of claim 1, wherein:
a current variation of a high-frequency torque current, a current variation of a high-frequency magnetic flux current or a combination of the current variation of the high-frequency torque current and the current variation of the high-frequency magnetic flux current represent as the high-frequency current variation of the synchronous reference coordinate current, and
the high-frequency torque current is a current signal of a q-axis current flowing through the rotary electric machine, and the high-frequency magnetic flux current is a current signal of a d-axis current flowing through the rotary electric machine.

4. The control device of claim 1, wherein the adding device is directly connected to the position estimation device to directly provide the second correction value to the position estimation device.

5. The control device of claim 1, further comprising:
a first switch coupled between the error compensation unit and the adding device;
a second switch coupled between the error controller and the adding device; and
a third switch coupled between the error controller and the error compensation unit,
wherein:
when the rotary electric machine operates in the test mode, the first switch is turned off, and the second switch and the third switch are turned on,
when the rotary electric machine exits the test mode, the first switch is turned on, and the second switch and the third switch are turned off.

6. The control device of claim 1, wherein the synchronous reference coordinate current comprises a torque current and a magnetic flux current.

7. The control device of claim 6, wherein computing the high-frequency current variation of the synchronous reference coordinate current comprises:
computing a high-frequency torque current and a current variation of the high-frequency torque current; and
computing a high-frequency magnetic flux current and a current variation of the high-frequency magnetic flux current.

8. The control device of claim 7, further comprising a high-frequency signal generator, generating and inputting a high-frequency signal for computing the high-frequency torque current and the high-frequency magnetic flux current.

9. The control device of claim 8, further comprising a controller, configured to simultaneously receive the high-frequency signal, the d-axis current command and the q-axis current command, and then correspondingly output a d-axis voltage and a q-axis voltage on a synchronous reference coordinate.

10. The control device of claim 9, further comprising a speed control device, providing the q-axis current command to the controller, and then the voltage conversion device generating three-phase voltages (Va, Vb, Vc) based on outputs of the controller.

11. A control method for a rotary electric machine, the control method comprising steps of:
providing a d-axis current command and a q-axis current command;
converting a rotary electric machine current passing through the rotary electric machine into a synchronous reference coordinate current;
computing a high-frequency current variation of the synchronous reference coordinate current;
according to the d-axis current command and the q-axis current command, outputting a first correction value corresponds to the d-axis current command and the q-axis current command;
adding the high-frequency current variation of the synchronous reference coordinate current and the first correction value to generate a second correction value to estimate a rotor position of the rotary electric machine;
outputting a phase estimation value based on the second correction value to perform a coordinate transformation calculation;
measuring the rotor position of the rotary electric machine to output a phase measurement value:
subtracting the phase estimation value from the phase measurement value to generate a phase error; and
continuously generating a revised value based on the phase error, and then adding the phase error and the high-frequency current variation of the synchronous reference coordinate current to generate the second correction value when the rotary electric machine operates in a test mode,
wherein when the phase error falls within a target range, the revised value is assigned as the first correction value, and the revised value, the d-axis current command and the q-axis current command correspond to the revised value are stored.

12. The control method of claim 11, wherein when the rotary electric machine operates in the test mode, and when the phase error falls within the target range each time, the first correction value corresponding to the d-axis current command and the q-axis current command are stored to build a table.

13. The control method of claim 11, wherein the synchronous reference coordinate current comprises a torque current and a magnetic flux current.

14. The control method of claim 13, wherein the step of computing the high-frequency current variation of the synchronous reference coordinate current comprises steps of:
   computing a high-frequency torque current and a current variation of the high-frequency torque current; and
   computing a high-frequency magnetic flux current and a current variation of the high-frequency magnetic flux current.

15. The control method of claim 14, further comprising a step of:
   inputting a high-frequency signal to compute the high-frequency torque current and the high-frequency magnetic flux current.

16. The control method of claim 15, further comprising a step of:
   receiving the high-frequency signal, the d-axis current command and the q-axis current command simultaneously, and then correspondingly outputting a d-axis voltage and a q-axis voltage on a synchronous reference coordinate.

* * * * *